United States Patent Office 2,791,000
Patented May 7, 1957

2,791,000
POLYMERIC DISPERSIONS AND METHOD OF USE THEREOF

Max Fredrick Bechtold, Kennett Square, Pa., assignor to E. I. du Pont de Nemours and Company, Wilmington, Del., a corporation of Delaware Application December 21, 1955, Serial No. 554,391

17 Claims. (Cl. 18—57)

This invention relates to polymeric dispersions and, more particularly, to formaldehyde polymeric dispersions and the preparation of shaped structures therefrom.

This application is a continuation-in-part of my application Serial No. 348,132, filed April 10, 1953.

Formaldehyde polymers are useful for conversion into fibers, films, and other shaped structures. Certain new formaldehyde polymers are particularly useful for this purpose because of their unique thermal stability and other desirable properties.

Fibers and films may be made from melts or from solutions of formaldehyde polymer. However, successful production of bubble-free monofils and clear films by melt extrusion requires the employment of special techniques, which makes this method of limited applicability. Furthermore, highest molecular weight polymers cannot be used because of excessive melt viscosity. The solution technique is also of restricted use because of polymer degradation and toxicity considerations during manipulation of hot solutions and limited number of practical solvents. Solution methods are further limited because the high viscosity of high molecular weight polymer limits the solids content that can be attained.

An object of the present invention is to provide new and useful formaldehyde polymer dispersions. A further object is to provide such dispersions which are adapted to be converted into shaped structures readily and to provide a simple process for accomplishing this. A more specific object is to provide coalescible formaldehyde polymer dispersions readily adapted to be converted into shaped structures and a process for effecting such conversion. Other objects will become apparent from the description of the invention and the claims given hereinafter.

The above objects are accomplished according to the present invention by providing a formaldehyde polymer dispersion comprising particles of an addition polymer of formaldehyde having an inherent viscosity of at least 0.8 and a particle size of less than 6 microns average diameter dispersed in an organic liquid having a boiling point of 150° C. to 240° C. and being a non-solvent for the formaldehyde polymer below 100° C. and a solvent therefor at temperatures above 100° C. The inherent viscosity mentioned is determined in conventional manner, using a 0.5% solution of the polymer at 60° C. in p-chlorophenol containing 2% of α-pinene. The invention further comprises the process of shaping the formaldehyde polymer dispersion and subjecting the shaped dispersion to a temperature above 100° C. and, preferably, between 125° C. and 225° C., until the polymer particles form a coalesced, homogeneous shaped structure substantially free of liquid components of the dispersion.

In a more specific, preferred embodiment, the present invention comprises a dispersion of an addition polymer of formaldehyde having an inherent viscosity of at least 1.0, containing 3% to 40%, and, more preferably, 7% to 25%, by weight of the dispersion, of formaldehyde polymer particles of less than 2 microns average diameter and, more preferably, in the range of 1 micron to 0.01 micron average diameter, dispersed in an organic liquid having a boiling point of 155° C. to 220° C. and being a non-solvent for the formaldehyde polymer below 100° C. but a solvent therefor at a temperature between 100° C. and 200° C.

It has now been found that the shortcomings of the prior methods of forming shaped formaldehyde polymer structures such as fibers and films can be overcome by the use of formaldehyde polymer dispersions as characterized above inasmuch as such dispersions can be readily shaped and, by heating above 100° C., quickly converted to coalesced, homogeneous shaped structures. To obtain a dispersion that is adapted to be converted readily to a coalesced, homogeneous structure, the particle size of the formaldehyde polymer is an important consideration. These polymer particles must be less than 6 microns average diameter and this applies to the particles regardless of whether, when viewed under microscope, the particle is shown to be actually a composite particle made up of a plurality of primary particles clustered together or whether the particle is simply a single primary particle. Preferably, the particles are composite particles of clustered primary particles or, at least, a good proportion of the particles are composite particles. Also, it is preferred that the particles, both composite particles and primary particles, should be less than 2 microns average diameter and, preferably, that the primary particles, as distinguished from the composite particles, should be of the order of 1 micron to 0.01 micron average diameter.

The dispersions of this invention can be prepared in various ways but in all cases the polymer particles are brought into intimate contact with the organic liquid, referred to as a "latent solvent" for convenience, at a temperature below 100° C. or, at least, at a temperature below that temperature at which the latent solvent exerts solvent action on the polymer. If it is necessary to reduce the average diameter of the suspended polymer particles so that they are 6 microns or less, this can be done while preparing the dispersion by mechanically working the mixture of polymer and latent solvent, as by milling.

In converting the coalescible dispersions of this invention into shaped structures, the dispersion is deposited by coating, extrusion, or other means on a supporting surface or substrate and heated, in air or other fluid, to a temperature above 100° C. that is high enough to cause the latent solvent to exert a solvent action. The heating is continued to remove the latent solvent and any other liquid components of the dispersion and to convert the polymer particles into a coalesced, homogeneous shaped structure. The shaped structure is then allowed to cool and separate from the substrate.

Formaldehyde polymers particularly suitable for use in the present invention may be prepared as follows: Gaseous monomeric formaldehyde of high purity is prepared by the pyrolysis of alpha-polyoxymethylene, passed through two traps at —15° C. for further purification and led into the top of a polymerization vessel. The liquid polymerization medium in the vessel, in which has been dissolved a polymerization initiator and/or dispersant, is stirred vigorously. As the formaldehyde is taken up into the liquid, it is rapidly converted to high polymer in the form of fine particles, which form a slurry in the polymerization medium. The resulting mixture is either used as such as in Examples I and II below, or the polymer may be isolated as a powder and dried before use as in the remaining examples below. Minor variations in the above procedure serve to produce formaldehyde polymers of varying viscosities and degrees of toughness. The variations pertinent to the polymers used in the several examples below are summarized in Table I.

ing Example IX). The film had a water vapor permeability of 17,000 (grams of water transported per hour per mil of thickness for a film area of 100 sq. meters at 39.5° C. under 53 mm. pressure differential of water

TABLE I

| Polymer | Polymerization Medium | Polymerization Temperature, ° C. | Other ingredients (percent by wt., based on wt. of medium) | Inherent Viscosity [1] of isolated polymer |
|---|---|---|---|---|
| A | decahydronaphthalene | −30 | 1% of the dioleate of a polyethylene glycol having an average mol. wt. of 400. | 1.66 |
| B | tetramethylurea | 25 | 0.18% of an 80/20 copolymer of lauryl methacrylate and β-diethylaminoethyl methacrylate. | 1.1 |
| C | n-pentane | 20 | 0.04% of a 75/25 copolymer of lauryl methacrylate and β-diethylaminoethyl methacrylate +0.4% polylauryl methacrylate. | 3.5 |
| D | do | 20 | 0.48% of a 90/10 copolymer of lauryl methacrylate and β-diethylaminoethyl methacrylate. | 2.0 |
| E | do | 20 | 0.1% of an 80/20 copolymer of lauryl methacrylate and β-diethylaminoethyl methacrylate +0.01% di-n-butylamine. | 2.8 |
| F | do | 25 | 0.6% of the dioleate of a polyethylene glycol having an average mol. wt. of 400+0.028% n-butylamine. | 2.2 |

[1] Determined as a 0.5% solution of the polymer at 60° C. in p-chlorophenol containing 2% of α-pinene.

The following examples wherein all proportions are by weight unless otherwise stated, illustrate specific embodiments of the invention. In those examples where the size of the polymer particles is not discussed, the primary polymer particles were substantially in the range of ½ micron to 1½ micron average diameter, with many present as clusters of average diameter of about 4 microns. The particles, both the composite cluster particles and the primary particles of polymer, were appreciably under 6 microns average diameter.

Example I

To 5 parts of a slurry of 8.5% by weight of polymer "C" in n-pentane, directly as prepared during polymerization without isolation of the polymer, was added 5 parts of tetramethylurea with mulling in a mortar until a considerable proportion of the pentane had evaporated. Next 0.5 part of benzyl alcohol was added with additional mulling. The resultant dispersion was spread in a thin layer on a 20-mil chromium plated metal plate, the underside of which was then heated over a gas burner until clarification ensued. The coating was quenched in water, then stripped to yield a substantially clear, tough film 0.5 to 1 mil in thickness having a tensile strength of 3300 lb./sq. in.

Example II

A suspension of polymer "B" in tetramethylurea directly as prepared during polymerization and containing 5% polymer "B" by weight was spread on a metal plate, coalesced and quenched as in Example I to yield a substantially clear, tough film.

Example III

Ten parts of polymer "D" was ball-milled 16 hours with 120 parts of furfuryl alcohol. By examination of the resultant fluid dispersion under the microscope, the polymer was found to be predominately in the form of clusters of about 4 microns in diameter of primary particles of about 1 micron in diameter. A portion of the dispersion was cast at 15 mils thickness using a doctor knife on a 20-mil chromium plated steel plate. The coated plate was placed in an oven at 205° C. After 5 minutes the temperature had dropped to 190° C.; the plate was removed and the film quenched and stripped in cold water. After drying, the film was tough, glossy and substantially clear. It had a tensile strength of 7,100 lb./sq. in. in the undrawn form. After being drawn at 165° C., the film had a tensile strength of 37,000 lb./sq. in. in the direction of orientation.

The undrawn film had a degree of toughness in excess of 100 (determined as described subsequently following Example IX). The film had a water vapor permeability of 17,000 (grams of water transported per hour per mil of thickness for a film area of 100 sq. meters at 39.5° C. under 53 mm. pressure differential of water vapor). A film prepared from dried polymer "D" powder by molding under 12,000 lbs. pressure for 1 minute at 190° C., which also exhibited a degree of toughness of over 100, had a water vapor permeability of only 1270. The high moisture permeability of the film prepared from dispersion is reflected in a much greater capacity of the film to "breathe" than is shown by the film prepared by molding under pressure.

Another portion of the above dispersion was extruded using a hydodermic syringe with a 20-gauge needle moving relative to a 20-mil chromium plated plate. The dispersion fibers on the plate were next exposed in a heated air chamber at 200–190° C. for 3 minutes, during which time the polymer particles coalesced (clarification ensued), and substantially all of the furfuryl alcohol evaporated. Next the fibers on the rigid surface were quenched in water, stripped and dried. The dried fibers were drawn while in contact with a hot metal rod at 165° C. They were markedly strengthened by this treatment. A monofil prepared in this manner had a cross-section area of 7.6 x 10$^{-6}$ square inches and tensile strength of 1.67 grams per denier.

When the above dispersion preparation was repeated using 10% by weight of polymer "D" in dipropylene glycol and working the mixture in a Waring Blendor, a fluid dispersion was obtained which, when cast, coalesced and quenched as in Example I, gave a tough, pliable film.

Example IV

Ten g. of polymer "D" was ball-milled for 6.5 hours in 110 g. of diacetone alcohol. Subsequently, an additional 2 g. of polymer was added, followed by ball-milling for 6 hours, then 2 g. of polymer was added with ball-milling for 2.5 hours, and a final 2 g. of the polymer was added followed by a final ball-milling of 2.5 hours. A somewhat flocculated, but cream-like dispersion was obtained. This dispersion was cast using a doctor knife set at 10 mils thickness onto a chromium plated 20-mil steel plate. Next the coated plate was heated underneath by means of a gas burner, at first slowly then very rapidly. Heating was stopped soon after clarification ensued, and the coated plate was quenched in water to strip the film. The dried film was tough, thin and glossy and had only very slight internal haze.

When diethylene glycol monoethyl ether was substituted for diacetone alcohol in this preparation, a pourable dispersion was obtained. This dispersion was coalesced by heating in an oven at 215–200° C. for 3.5 to 4 minutes. Excellent colorless films were obtained. They were tough, quite glossy on the plate side, but somewhat satin-like on the top surface.

In a similar manner, ball-milling 10 parts of polymer "E" for 64 hours with 120 parts of diethylene glycol monomethyl ether gave a fluid dispersion which had an equilibrium sedimentation volume of approximately 90%. Microscopic examination of the dispersion showed it to consist of primary particles about 0.5 to 1.0 micron in diameter, most of which were present in clusters of average diameter less than 6 microns. A clear, tough film was prepared by the coalescence technique of Example I.

*Example V*

To 10 g. of a 20% aqueous dispersion of polyvinyl fluoride prepared as in Example I of Bechtold and Bro U. S. application Ser. No. 348,133, filed April 10, 1953, were added 2 g. of polymer "E" and 18 g. of diacetone alcohol. This mixture was ball-milled for 21 hours to give a fluid, but flocculated dispersion. A film was prepared by casting and coalescing as in Example I. Films from this codispersion were less sensitive to degradation by overheating after coalescence than similar films of unmodified formaldehyde polymer.

*Example VI*

To 11 parts of a polyvinyl fluoride/H$_2$O/tetramethylurea (9/41/50) dispersion prepared as in Example I of the above U. S. application Ser. No. 348,133, was added 1 part of polymer "E" powder and 9 parts of tetramethylurea. This mixture was ball-milled for 21 hours to yield a fluid, slightly flocculated dispersion. A film was prepared therefrom by the coalescence technique of Example I. A strong, glossy, clear film was obtained.

*Example VII*

Ten parts of polymer "A" were ball-milled for 2 hours with 120 parts of cyclohexanol. Subsequently, 3.3 parts of polymer "A" were added and ball-milling continued for 16 hours. A fluid dispersion with an equilibrium sedimentation volume of 93% was obtained. Films of excellent clarity were obtained by the coalescence technique of Example I, particularly when quenching was very rapid and/or quenching was performed just prior to complete evaporation of cyclohexanol from the clarified film.

*Example VIII*

Ten parts of polymer "F" were ball-milled 3 hours with 110 parts of triethyl phosphate, then 5 additional parts of the polymer were added followed by ball-milling for 2 hours, then 2 additional parts of polymer were added followed by a final ball-mill of 16 hours. The resultant dispersion was dilatant and barely pourable. It was cast and coalesced as in Example I to yield a continuous film.

*Example IX*

One part of polymer "B" was mulled in a mortar with 13 parts of acetonyl acetone until a homogeneous flowable dispersion was obtained. This dispersion was cast and quenched by the technique of Example I to yield a tough, continuous, slightly hazy film.

It will be understood that the above Examples are merely illustrative and that the invention broadly comprises a dispersion of formaldehyde polymer particles of less than 6 microns average diameter dispersed in an organic liquid having a boiling point of 150° C. to 240° C. and being a non-solvent for the formaldehyde polymer below 100° C. and a solvent therefor at temperatures above 100° C., and the process of shaping such dispersion and subjecting the shaped dispersion to a temperature above 100° C. until the polymer particles form a coalesced, homogeneous shaped structure substantially free of liquid components of the dispersion.

The formaldehyde polymers herein considered are addition polymers of formaldehyde which consist essentially of formaldehyde and are not to be confused with the well-known condensation polymers of formaldehyde with phenol, urea, and the like. The properties especially suited for self-supporting films are found in the formaldehyde polymers which have inherent viscosities of at least 1, measured on 0.5% solutions at 60° C. in p-chlorophenol containing 2% alpha-pinene, and degrees of toughness of at least 1. "Degree of toughness" is determined on compression-molded films of 3 to 7 mils in thickness which have been heated for 1 week at 105° C. in an air circulating oven, cooling the films, folding the film through 180° C., creasing, folding in the reverse direction through 360° C., and creasing again. The number of cycles which the film withstands before breaking at the crease line is referred to as the degree of toughness. Thus, if the film breaks in the first cycle, its degree of toughness is zero. If it withstands one complete cycle but breaks in the second cycle, the degree of toughness is 1, and so forth. These values for degree of toughness can be quite high. Thus the film of Example III had not broken after 100 cycles in this test. It is to be understood that the preference for high quality formaldehyde polymers noted above is not limiting. Formaldehyde polymers with substantially inferior physical properties may be employed where it is desired to prepare shaped structures at minimum expense for less critical uses.

It is essential that the formaldehyde polymer of proper particle size be dispersed in an organic liquid which is a latent solvent for the polymer. The latent solvent should boil between 150° C. and 240° C., preferably at 155° C.–220° C., and be a non-solvent for the polymer below 100° C. but possess substantial solvent power at higher temperatures, especially at a temperature in the range of 100° C. to 200° C. A simple manner of determining whether an organic liquid is a suitable latent solvent for use in this invention is by immersing a piece of the formaldehyde polymer film 1 cm. x 1 cm. x 5 mils thick in 5 cc. of the liquid, warming to 100–200° C. until a substantial proportion of the film dissolves, then cooling until polymer precipitates for verification that solution has occurred without serious degradation. Examples of suitable latent solvents are alcohols such as furfuryl and tetrahydrofurfuryl alcohols, cyclohexanol, diethylene glycol monoethyl ether, diacetone alcohol, dipropylene glycol, 1,5-pentanediol, beta(methoxymethoxy)ethanol, and the like, amides such as N-ethyl formamide, tetramethylurea, N,N-dimethyl acetamide, N,N-dimethyl formamide, N,N-dimethyl hydroxy acetamide, and the like, ethers such as diethylene glycol diethyl ether, and the like, ketones such as acetonyl acetone, and the like, esters of phosphorus acids such as triethyl phosphate, and the like.

While it is essential that the formaldehyde polymer be dispersed in a latent solvent according to this invention, the presence of other liquids together with the latent solvent is permissible. Such other liquids must be non-solvents for the formaldehyde polymer below 100° C., miscible with the latent solvent, and must boil below 240° C. Examples of liquids which can be present together with the latent solvent, are water and those aliphatic hydrocarbons boiling below 240° C. Such liquids should not be present in an amount greater than 33⅓% by combined weight of the liquid and the latent solvent. The test given above for the selection of suitable latent solvents is to be carried out on the latent solvent in the absence of other liquids.

Examples V and VI illustrate an important embodiment of the invention wherein a liquid in addition to the latent solvent is necessarily present in the dispersion. Excellent films and fibers can be made from these codispersions of polyvinyl fluoride and formaldehyde polymer but the polyvinyl fluoride must be first dispersed in an aqueous medium. As the examples show, by limiting the water introduced into the dispersion when the polyvinyl fluoride dispersion is combined with the formaldehyde polymer dispersion, to less than 33⅓% of the combined weight of water and latent solvent, the codispersions were readily coalesced to give films of excellent properties.

A convenient and practical way of dispersing the formaldehyde polymer in the latent solvent is by ball-milling, or by using commercial colloid mills or conventional high speed stirring or blending equipment, e. g., the Waring Blendor. However, a temperature below that at which the latent solvent exerts solvent action on the polymer, must be maintained. Practically, the temperature is kept below 100° C. during the dispersing of the polymer in the latent solvent. Liquids other than the latent solvent can be present during this step although they must not exceed the maximum of 33⅓% of the combined weight of such liquids and the latent solvent, in the final dispersion. Mixtures of several latent solvents can be used.

The amount of time and work required to disperse the formaldehyde polymer in the latent solvent is variable and depends upon such factors as the nature of the latent solvent, efficiency of the dispersing means employed, particle size of the polymer, degree of dispersion desired. Average polymer particle diameters of less than 6 microns, and preferably of less than 2 microns, for both composite and primary particles, are used with the preferred range for the primary particles being from 1 micron to 0.01 micron. The coalescibility of such dispersions is best when the primary particles are loosely clustered to form composite particles. When the polymer is synthesized as a dispersion in an inert liquid, transfer of the polymer to the latent solvent can be effected by conventional methods.

The coalescible dispersions of this invention are adaptable for conversion to shaped structures, as by coating, impregnating, casting and the like. These shaped structures are characterized by homogeneity, toughness, clarity, and ability to be drawn. These structures are made by shaping the dispersion, e. g., by casting it on a substrate by the use of a doctor knife, by extruding it through a slot, or by use of a casting roll, then subjecting it to an elevated temperature above 100° C., preferably between 125° C. and 225° C. During this heat treatment, the polymer is subjected to the latent solvent at a temperature at which the latter becomes an active solvent. Although the precise mechanism of coalescence which ensues is not fully understood, it is probable that segments of polymer molecules on the surface of the particles become mobilized by heat and solvent action and entangle with similarly mobilized segments on the surface of neighboring particles. As heating continues, the latent solvent evaporates, leaving the formaldehyde polymer as a coalesced, homogeneous, shaped structure essentially free of latent solvent and having the previously mentioned valuable properties.

In general, it is desirable that the rate of heating of the coalescing structure be as fast as possible without boiling. This serves to bring the temperature of the polymer particles up while there is still solvent present. Slow evaporation is undesirable because it may permit the escape of solvent without coalescence. The entire process is actually very rapid with films or filaments in the usual range of thickness or denier. Generally, it is complete in from one second or less to 30 minutes, the final stages being recognizable by the change from an opaque layer to a transparent structure and by the attainment of maximum tensile or tear strength. Maximum clarity of films is attained by discontinuing heating just prior to complete evaporation of latent solvent and by quenching the hot film, for example, in cold water.

The dispersions of the present invention can be used for coating or impregnating, as of paper, cloth, and the like. For such uses, a dispersion of extremely low polymer concentration down to 0.5% to 1% by weight of the dispersion, can be used to advantage. For the preparation of self-supporting structures of formaldehyde polymer, it is desirable that the coalescible dispersions contain at least 3% of formaldehyde polymer by weight of the dispersion. For best results, dispersions containing at least 7% polymer, by weight of the dispersion, but not more than 40% are preferred. Above a concentration of 40% polymer, difficulty in casting the dispersion due to high viscosity is apt to be encountered. Dispersions containing from 7% to 25% polymer, by weight of the dispersion, are preferred because this concentration range represents a proper balance of properties and polymer content practical for casting.

The dispersions of this invention can contain in addition to the formaldehyde polymer and latent solvent, the usual modifying materials such as, for example, pigments, dyes, plasticizers, fillers, and delusterants.

A particular advantage of this invention is that it provides a means of obtaining shaped formaldehyde polymer structures without the difficulties inherent in the melt extrusion and solution methods heretofore proposed. The dispersions of this invention can be readily converted into shaped structures by coalescence of the polymer particles. Furthermore, these dispersions are highly useful in the impregnation and coating of paper, fabrics, and the like.

As many apparently widely different embodiments of this invention may be made without departing from the spirit and scope thereof, it is to be understood that the invention is not limited to the specific embodiments thereof except as defined in the appended claims.

The invention claimed is:

1. A formaldehyde polymer dispersion comprising particles of an addition polymer of formaldehyde of less than 6 microns average diameter dispersed in an organic liquid having a boiling point of 150° C. to 240° C. and being a non-solvent for said polymer below 100° C. and a solvent therefor at temperatures above 100° C., said polymer having an inherent viscosity of at least 0.8 as measured on a 0.5% solution at 60° C. in p-chlorophenol containing 2% alpha-pinene.

2. A formaldehyde polymer dispersion as set forth in claim 1 wherein said polymer particles are of less than 2 microns average diameter.

3. A formaldehyde polymer dispersion as set forth in claim 2 wherein the primary particles of polymer have average diameter of 1 micron to 0.01 micron.

4. A formaldehyde polymer dispersion as set forth in claim 3 wherein said organic liquid has a boiling point of 155° C. to 220° C.

5. A formaldehyde polymer dispersion as set forth in claim 3 wherein said polymer amounts to 7% to 25% by weight of said dispersion.

6. A formaldehyde polymer dispersion as set forth in claim 1 wherein said organic liquid has a boiling point of 155° C. to 220° C.

7. A formaldehyde polymer dispersion as set forth in claim 1 wherein said polymer amounts to 3% to 40% by weight of said dispersion.

8. A formaldehyde polymer dispersion comprising particles of an addition polymer of formaldehyde of less than 6 microns average diameter dispersed in tetramethylurea, said polymer having an inherent viscosity of substantially at least 1 as measured on a 0.5% solution at 60° C. in p-chlorophenol containing 2% alpha-pinene.

9. A formaldehyde polymer dispersion comprising particles of an addition polymer of formaldehyde of less than 6 microns average diameter dispersed in cyclohexanol, said polymer having an inherent viscosity of at least 0.8 as measured on a 0.5% solution at 60° C. in p-chlorophenol containing 2% alpha-pinene.

10. A process for shaping an addition polymer of formaldehyde having an inherent viscosity of at least 0.8 as measured on a 0.5% solution at 60° C. in p-chlorophenol containing 2% alpha-pinene, which comprises dispersing particles of said polymer of less than 6 microns average diameter in an organic liquid to form a dispersion containing 0.5% to 40% of polymer particles, said liquid being one which has a boiling point of 150° C. to 240° C. and is a latent solvent for said polymer, being a non-solvent therefor at temperatures below 100° C. and a solvent therefor above 100° C., depositing the dispersion on a supporting surface, heating the deposited dispersion to a temperature above 100° C. to coalesce said polymer particles by latent solvent action of said liquid, and removing liquid from said coalesced polymer to form a homogeneous shaped structure.

11. A process for forming self-supporting shaped structures of an addition polymer of formaldehyde having an inherent viscosity of at least 1 as measured on a 0.5% solution at 60° C. in p-chlorophenol containing 2% alpha-pinene, which comprises dispersing particles of said polymer of less than 2 microns average diameter in an organic liquid to form a dispersion containing 3% to 40% of polymer particles, said liquid being one which has a boiling point of 155° C. to 220° C. and is a latent solvent for said polymer, being a non-solvent therefor at temperatures below 100° C. and a solvent therefor between 100° C. and 200° C., depositing the dispersion on a supporting surface, heating the deposited dispersion to a temperature between 125° C. and 225° C. to coalesce said polymer particles by latent solvent action of said liquid, removing liquid from said coalesced polymer to form a homogeneous shaped structure and removing the shaped structure from the supporting surface.

12. A process as defined in claim 11 wherein said dispersion contains 7% to 25% of polymer.

13. A process as defined in claim 11 wherein the primary particles of polymer in said dispersion have average diameters of 1 micron to 0.01 micron.

14. A process for forming a self-supporting film of an addition polymer of formaldehyde having an inherent viscosity of at least 1 as measured on a 0.5% solution at 60° C. in p-chlorophenol containing 2% alphapinene, which comprises dispersing particles of said polymer of less than 2 microns average diameter in an organic liquid to form a dispersion containing 7% to 25% of polymer particles, said liquid being one which has a boiling point of 155° C. to 220° C. and is a latent solvent for said polymer, being a non-solvent therefor at temperatures below 100° C. and a solvent therefor between 100° C. and 200° C., casting the dispersion on a supporting surface to form a film, heating the deposited dispersion to a temperature between 125° C. and 225° C. to coalesce said polymer particles by latent solvent action of said liquid, continuing the heating to evaporate the liquid and quenching the film to form a coalesced, homogeneous film, and removing the film from the supporting surface.

15. A process as defined in claim 14 wherein the heating is discontinued and the film is quenched just prior to complete evaporation of said latent solvent.

16. A process as defined in claim 14 wherein said polymer is one which gives a degree of toughness of at least 1 in films of 3 to 7 mils thickness formed therefrom.

17. A process as defined in claim 14 wherein the primary particles of polymer in said dispersion have average diameters of 1 micron to 0.01 micron.

References Cited in the file of this patent
UNITED STATES PATENTS 1,557,521     Ellis ---------------- Oct. 13, 1925